United States Patent [19]

Taylor

[11] 3,894,752

[45] July 15, 1975

[54] SPRUNG SELF LEVELLING PICK UP HITCH

[76] Inventor: William Stuart Hickie Taylor, High Den, Sheepstreet Ln., Etchingham, England

[22] Filed: May 15, 1974

[21] Appl. No.: 470,034

[52] U.S. Cl............................................ 280/405 R
[51] Int. Cl............................................... B60d 1/16
[58] Field of Search............ 280/405 R, 446 R, 448, 280/483, 487, 489

[56] References Cited

UNITED STATES PATENTS

| | | | |
|---|---|---|---|
| 3,295,866 | 1/1967 | Standfuss | 280/489 X |
| 3,580,608 | 5/1971 | Grant | 280/405 R |
| 3,618,984 | 11/1971 | Cook | 280/489 |

FOREIGN PATENTS OR APPLICATIONS

| | | | |
|---|---|---|---|
| 527,705 | 7/1956 | Canada | 280/483 |

*Primary Examiner*—Leo Friaglia
*Assistant Examiner*—R. Schrecengost
*Attorney, Agent, or Firm*—Pearson & Pearson

[57] ABSTRACT

A sprung, self-levelling pick-up hitch for a motor vehicle consists of a rigid framework secured to a driven axle, a hitch and linkage assembly pivotally mounted on the framework, a leaf-spring extending parallel to the axle and acting on the hitch and linkage assembly to load the same towards an operative position, and a piston and cylinder arrangement through which the leaf-spring is connected with the said hitch and linkage assembly and by which the said leaf-spring is tensioned, the piston and cylinder arrangement being adapted to maintain the hitch in a sensibly constant position when under load.

17 Claims, 4 Drawing Figures

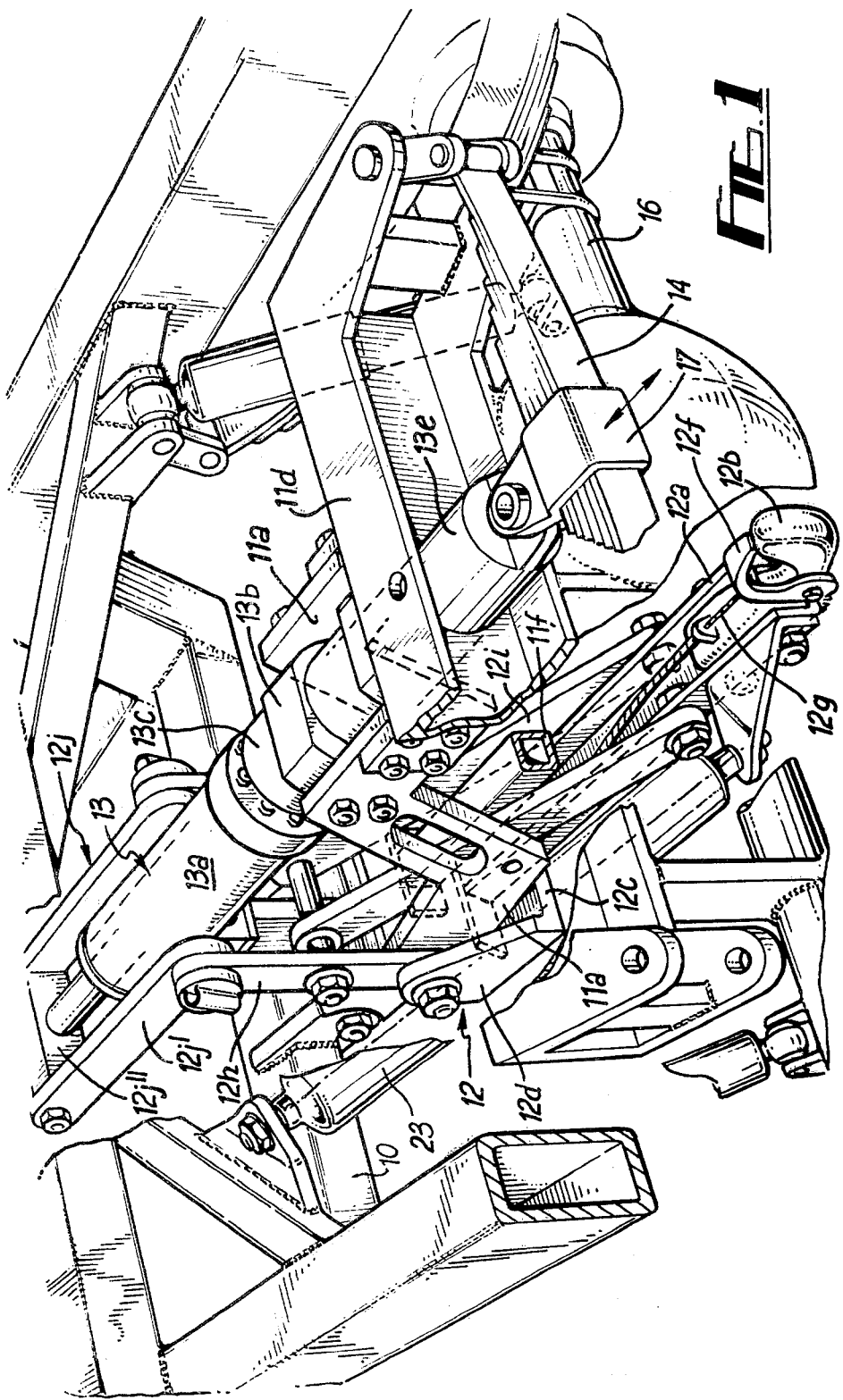

SPRUNG SELF LEVELLING PICK UP HITCH

The invention concerns a sprung, self-levelling pick-up hitch arrangement for a motor vehicle.

The primary object of the present invention is to provide a sprung, self-levelling pick-up hitch arrangement for a motor vehicle which will support the trailer load substantially independently of the vehicle suspension and will accordingly have little or no adverse effect on the traction between the drive wheels and the ground wheel when the tractor/trailer combination is moving over rough ground.

According to the present invention, a sprung self-levelling pick-up hitch arrangement for a motor vehicle comprises a rigid support frame, adapted to be secured to a driven axle which forms part of or is connected to the vehicle, a hitch and linkage assembly pivotally mounted upon the support framework, a resilient means mounted relative to the said assembly and adapted to support the hitch and linkage assembly in an inoperative position, and adjustable transmission means interposed between the resilient means and the hitch and linkage assembly and adapted to tension the resilient means to maintain the hitch in a sensibly constant operative position when under load.

The arrangement may be provided as a unit for application to a tractor vehicle or for application to a bogey having a driven axle and intended to be connected with a tractor vehicle. Alternatively, the arrangement may be embodied in a tractor vehicle during the construction and as an integral part thereof.

The invention will now be described further, by way of example only, with reference to the accompanying drawings illustrating one embodiment thereof and in which:

FIG. 1 is a broken away perspective view, taken from above, and shows a sprung, self-levelling pick-up hitch constructed in accordance with the invention and applied to a tractor vehicle;

Figure 4:
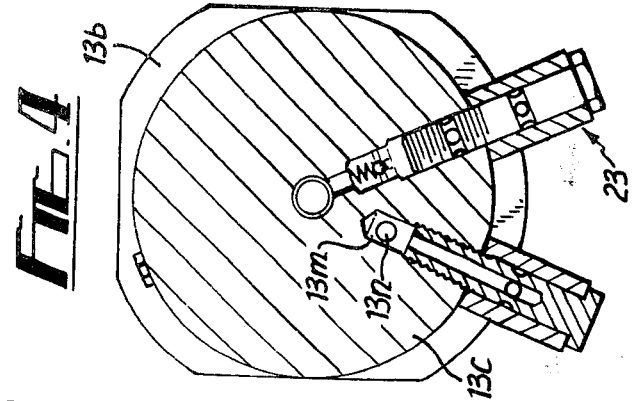
FIG. 4 is a section taken on line IV—IV of FIG. 3.
Figure 2:
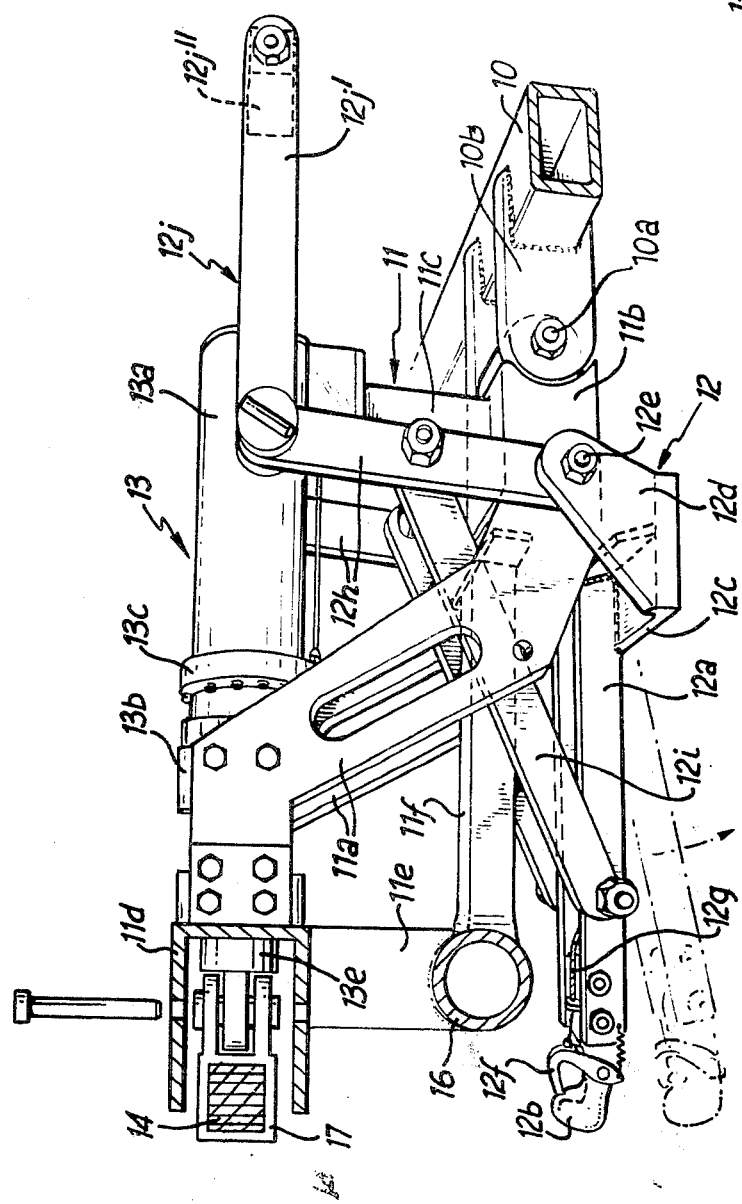
FIG. 2 is a side elevation, partly in section, of the hitch shown in FIG. 1, the vibration damper between the swinging arm and chassis having been omitted, in the interests of clarity.

Referring now to the drawings, a sprung, selflevelling pick-up hitch comprises a support framework 11 mounted in position upon the vehicle, a hitch and linkage assembly 12 pivotally secured to the support framework, and a piston and cylinder unit 13 carried by the said support frame and in generally horizontally arranged disposition thereon, opposite ends of the unit 13 co-operating respectively with a spring means 14 and with the hitch and linkage assembly 12.

The support framework 11 consists of two support arms 11a arranged in parallel side-by-side disposition, such arms lying in the longitudinal direction of the vehicle and each being of generally Z-shaped configuration, a mounting block 11b from which the arms extend rearwardly of the vehicle and which has an upwardly directed pillar 11c to provide a support to the piston and cylinder unit 13 at the forward end thereof, a yoke 11d bolted to the rearward ends of the support arms 11a and transversely of such arms, and bracing struts 11e, 11f extending from the vehicle rear axle 16 to the yoke 11d and to the mounting block 11b respectively. The yoke 11d is of channel-shaped cross-section and supports the spring means 14 in a manner and for the purpose hereafter to be explained.

At one end, the support framework 11 is connected suitably by a universal coupling, to a transverse element 17 of the vehicle chassis by means of a pin 10a engaged with spaced, rearwardly extending lugs 10b, between which the mounting block 11b is located, and with the mounting block 11b, whilst, at the other end, the framework 11 is supported by the vehicle axle 16.

The hitch and linkage assembly 12 includes a swinging arm 12a defined by an upwardly facing channel element carrying, at its rearward end, a towing hook 12b and secured at its forward end to a plate 12c as by welding, the lateral ends of the plate having lugs 12d upstanding therefrom whereby the assembly is pivotably attached to the support framework 11 by means of a bolt 12e. A spring loaded catch 12f is pivotally mounted on the swinging arm 12a adjacent to the towing hook 12b for co-operation with such hook to retain a trailer hitch ring (not shown) in engagement therewith. A release cable 12g is provided for displacing the catch from its operative position against the restraint of the spring. The assembly further includes two draw arms 12h arranged one at each side of the support framework and between such framework and a respective one of the lugs 12d, the arms being pivotably supported, at their lower ends, on the bolt 12e for motion about the axis thereof, and drag-links 12i connecting the draw arms 12h with the channel member which defines the swinging arm 12a. The assembly is completed by a U-shaped yoke 12j of which the remote ends of the parallel limbs 12j are connected to the upper ends of the draw arms 12h and of which the central portion 12j" is connected to the end of a forwardly extending ram of the cylinder unit.

The piston and cylinder unit 13 comprises two coaxially arranged cylindrical sleeves 13a, 13b extending outwardly from opposite faces of a central support block 13c and each having a respective ram 13d, 13e slidable therein. The unit is arranged with its axis parallel to the longitudinal axis of the vehicle, the forwardly extending ram 13d being connected with the yoke 12j of the hitch and linkage assembly, as before described, and the rearwardly extending ram 13e being joined to the spring means 14 by a shackle 17 extending thereabout. The forward end of the sleeve 13a within which ram 13d moves is closed by an end cap 13f through which the stem 13d' of the ram passes, the inner face of the cap providing cavitites 13g to receive cushioning springs (not shown) to define resilient end stops to continued motion of the ram outwardly of the sleeve. The outer end of the other sleeve 13b is formed with an inwardly directed peripheral flange 13h defining a retaining lip which bears on the stem 13e' of the ram 13e through suitable sealing means.

Ram 13d has an axial passage 13i in fluid flow connection with a radial passage 13j leading to the cylindrical face of the ram, the radial passage 13j being selectively co-operable with an outlet port 18 in the sleeve 13a according to the axial position of the ram within the sleeve, such port leading to a fluid chamber 19 provided at the outer surface of the sleeve and adjacent one end thereof. A lead in channel 18a is provided at the inner surface of sleeve 13a, such channel terminating at the periphery of the outlet port and being of increasing depth towards such port so that the rate of flow of fluid to the port will increase as the radial passage in the ram 13d moves into direct alignment with the port.

The central support block 13c has an axially directed through-bore 13k therein connecting the chambers 21, 22 of the two aligned sleeves 13a, 13b, such bore 13k having a spring-loaded, one-way valve 13l therein for permitting flow from chamber 21 to chamber 22. The central support block 13c further includes a radial passage 13m extending from the periphery of such block to a position short of the axis of the piston and cylinder unit, such radial passage 13m connecting with an axial passage 13n within the block and through which fluid is fed to chamber 21. At its outer end, the radial passage 13m is coupled to a feed pipe (not shown) through which pressure fluid is supplied to the unit from a suitable pump.

A second axial through bore 13o is provided in the support block, such bore being of a lesser diameter than that of the through bore 13k and serving to provide a return path for fluid moving from chamber 22 to chamber 21. To allow of an adjustment in the rate of flow through the second through-bore 13o, an adjustment screw 13p is provided which extends transversely into the bore, the position of the screw 13p, in the axial direction thereof, being varied to vary the effective crosssectional dimension of the bore.

Figure 3:
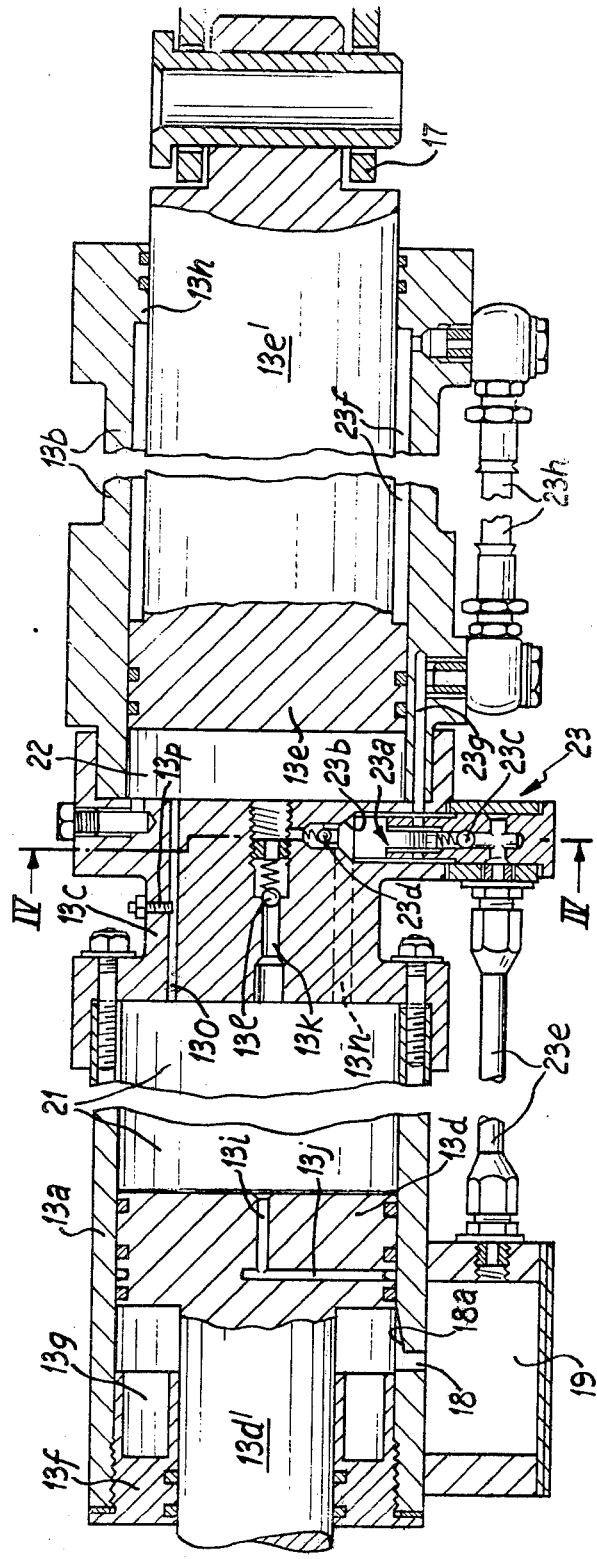
FIG. 3 is a longitudinal section, drawn to a larger scale, of the piston and cylinder unit embodied in the structure shown in FIGS. 1 and 2.

The piston and cylinder unit 13 conveniently includes a self priming device 23, such device, upon operation, drawing a hydraulic fluid from chamber 19 and supplying the same to chamber 22 so as to make-up any fluid which has escaped from chamber 21 through outlet port 18. The self priming device consists of a one-way valve arrangement 23a which receives fluid at low pressure from chamber 19, which delivers such fluid to an intensifier, and which then transmits the fluid under pressure to chamber 22. The valve arrangement is disposed in a radial passage 23b in the support block, such passage connecting with through bore 13k at a position downstream of the ball therein, and includes two spring-loaded ball valves 23c, 23d arranged in spaced apart disposition, the valve arrangement being connected with chamber 19 at a position upstream of the first ball valve 23c through a conduit 23e being connected with chamber 22 downstream of the second ball valve 23d, and being connected with the intensifier at a position intermediate the two ball valves. The intensifier comprises an annular chamber 23f between the stem 13e' of the ram 13e and the bore of the sleeve 13b within which such ram moves, such chamber 23f being connected to the one-way valve arrangement 23a through an axially directed passageway 23g in the sleeve 13b and a conduit 23h. In operation, as ram 13e moves to the left (as seen in FIG. 3), the pressure within the annular chamber 23f is reduced and fluid is drawn into such chamber from chamber 19 through conduit 23e, the first part of the one-way valve arrangement, and thence to the axial passageway 23g and the conduit 23 h. When the ram reverses its direction of movement, fluid within the annular chamber is placed under pressure and is forced from such chamber back to the one-way valve arrangement and thence to bore 13k through the upper part of such arrangement, ball valve 23c preventing return flow towards chamber 19.

The chamber 19 extends partly around the circumference of the sleeve by which it is supported and has a drain port therein at the upper region thereof. Air exists in the chamber above the level of the drain port and provides a cushion to prevent build-up of a fluid block behind ram 13d. The drain port is connected with the main fluid reservoir.

It is to be observed that the hitch point, that is to say the towing hook, is vertically aligned or substantially vertically aligned, with the wheel axle, such arrangement ensuring that the vehicle chassis is not loaded from the trailer.

In use, the hitch-ring of a trailer is applied to the towing hook and fluid under pressure is applied to the piston and cylinder unit from a suitable pump, conveniently on the tractor vehicle. As the fluid is fed to the unit through passageways 13m, 13n, ram 13d is moved to the left, as seen in FIG. 3, to lift the load and ram 13e moves to the right to tension the spring means. When ram 13d reaches a position whereat the lead-in 18a to port 18 is partially uncovered, excess fluid passes through the port and further movement of the rams is checked, subject to overrun due to inertia forces. In such condition the swinging arm, together with the load, is raised to its operating position. The pump is switched off. Any initial overrun of ram 13d will be compensated for by a reduction in fluid pressure within chamber 21, 22, and a consequential movement of ram 13d to close port 18 and prevent further pressure drop.

During towing, any trailer reaction to a bump movement of the powered wheels of the tractor vehicle which causes the back axle to rise relative to the hitch is manifested as a change of load on ram 13d in the axial direction thereof, such change of load giving rise to an axial shift of such ram to force fluid from chamber 21 to chamber 22 through the ball valve, (as well as through bore 13o), thereby tensioning the spring. The axial shift of ram 13e' discharges fluid from the intensifier into chamber 22 to increase slightly the extent of motion of the ram. On return motion of the spring fluid is forced through bore 13o, flow continuing until the pressure in the two chambers are equalised.

If due to a hole in the surface, the driven wheel drops in relation to the position of the hitch, the ram 13d moves to uncover port 18 and also gives rise to a reduction in fluid pressure in chamber 21 which permits fluid to flow from chamber 22 to equalise the pressures. The consequential movement of ram 13e adjusts the spring tension to match the load applied by the trailer. Any loss of fluid through port 18 is made up by the intensifier on the next compression stroke of ram 13e.

Excessive return movement of ram 13d caused by dropping of the axle in relation to the hitch position is cushioned by springs located in the rear face of end cap 13f.

In the event of sudden loads arising from abnormal movement of the axle to which the support framework is attached, in reaction to the inertia of the hitch load, such loads will be taken by the spring means 14 rather than by the suspension system of the towing vehicle. The restriction imposed by the small diameter of the bore in the central support block serve to damp movements of the swinging arm and will damp axle movements in conjunction with any damping incorporated in the tractors normal axle suspension.

In order to avoid possible resonance effects, of axle movement from the sprung mass of the tractor chassis and the sprung hitch both acting on the axle, we propose to include, if necessary, a damper between the swinging arm and the vehicle chassis, such damper being shown in the drawing at 23.

The invention is not restricted to the exact features of the embodiment described, since alternatives will present themselves to one skilled in the art. Thus, if desired, the self-priming device may be omitted and the system reprimed if pressure is lost due to "blowing-off" of a relief valve, it being understood that port 18 in the sleeve 13a would not be present.

As an alternative to the piston and cylinder unit, it may be preferred to embody an adjustable mechanical coupling as defined, for example, by coaxial, screw-threaded rods having a turn-buckle or like connection therebetween.

As an alternative to the spring means for loading the structure, any resiliently deformable body having suitable load characteristics may be used. Thus, for example, a resiliently compressible body, coil springs, or one or more torsion bars may be embodied.

Whilst the invention has been described in connection with a tractor vehicle, it is to be understood that the hitch may equally well be provided on a bogey having driven wheels, such bogey being intended to be disposed between a trailer and a tractor vehicle.

Whilst in the embodiment described and illustrated the support framework has been shown to be firmly secured to the vehicle axle and to the vehicle chassis, the latter connection being via a universal coupling, it may be found satisfactory to connect the hitch arrangement and the axle secured thereto to the vehicle through the vehicle suspension system and to dispense with the universal coupling, the rigid connection of the support framework with the vehicle axle being retained.

What I claim is:

1. A sprung self-levelling pick-up hitch arrangement for a motor vehicle having a suspended driving axle, the arrangement comprising a rigid support framework adapted to be secured to the said axle, a hitch arm pivotally mounted on the support framework for angular motion relative thereto, a linkage assembly operatively connected with the said hitch arm and sensitive to angular motion thereof, a resilient means mounted relative to the said assembly for supporting the hitch arm in a predetermined operative position, and adjustable transmission means interposed between and operatively connected with the resilient means and the linkage assembly, the said transmission means being adapted to tension the resilient means to maintain the hitch arm in a sensibly constant operative position when under load irrespective of that load.

2. The arrangement as claimed in claim 1 wherein the adjustable transmission means comprises an hydraulic piston and cylinder arrangement.

3. The arrangement as claimed in claim 2 wherein the hydraulic piston and cylinder arrangement includes spaced fluid chambers and a respective ram movably mounted in each such chamber, the chambers being arranged in fluid flow connection and the rams being connected with the resilient means and with the hitch and linkage assembly respectively.

4. The arrangement as claimed in claim 3 including fluid flow connections between the chambers, the said connections comprising spaced flow passages of different cross-section dimensions, the larger diameter passage having a one-way valve therein permitting fluid flow from the chamber related to the ram connected with the hitch and linkage arrangement to the other chamber.

5. An arrangement as claimed in claim 4 wherein the fluid chambers are arranged in axially aligned disposition and a body part extends therebetween thereby to separate the same, the spaced flow passages being provided in such body part.

6. An arrangement as claimed in claim 2 including an outlet port in one chamber adapted to be uncovered by the ram moving therein at that end of the range of movement of such ram corresponding to an operational condition of the hitch and linkage assembly.

7. An arrangement as claimed in claim 2 wherein at least one chamber has resilient abutment means therein at the extreme outermost position of the ram, such abutment means defining an end stop adapted to limit the movement of the ram in one direction of movement thereof.

8. An arrangement as claimed in claim 6 further including a self-priming device adapted to receive fluid from the said outlet port and to return the same to the chambers.

9. An arrangement as claimed in claim 8 wherein the self-priming device includes a pressure intensifier defined by the piston and cylinder arrangement.

10. An arrangement as claimed in claim 9 wherein the pressure intensifier includes an annular chamber defined by and between that ram of a piston and cylinder arrangement which is connected with the spring means and the bore of the cylinder, the intensifier being positioned to receive fluid at low pressure from a chamber between two series arranged one-way valves and to return fluid at high pressure to such chamber.

11. An arrangement as claimed in claim 1 wherein the resilient means comprises an elastic material.

12. An arrangement as claimed in claim 11 wherein the elastic material comprises springs.

13. The arrangement as claimed in claim 1 in combination with a vehicle having a powered axle, the said arrangement being secured to the said axle and movably attached to a fixed part of the vehicle.

14. The combination claimed in claim 13 wherein a universal connection is provided for movably attaching the arrangement to the fixed part of the vehicle.

15. The combination as claimed in claim 13 wherein the hitch and linkage assembly has a hook arranged substantially in vertical alignment with the driven axle.

16. The combination as claimed in claim 15 wherein the said hook is disposed below the driven axle.

17. The combination as claimed in claim 13 further including a damper extending between and secured to the hitch and linkage assembly and a fixed part of the vehicle.

* * * * *